April 16, 1968          J. P. BACON          3,378,705

ULTRASONIC TRANSDUCERS AND METHOD OF MANUFACTURE THEREOF

Filed Jan. 26, 1966

INVENTOR.
JOHN P. BACON
BY *E. B. Batchelder*
ATTORNEY

3,378,705
ULTRASONIC TRANSDUCERS AND METHOD OF MANUFACTURE THEREOF

John P. Bacon, Delran, N.J., assignor to The Budd Company, Philadelphia, Pa., a corporation of Pennsylvania
Filed Jan. 26, 1966, Ser. No. 523,161
5 Claims. (Cl. 310—9.5)

The present invention relates generally to ultrasonic-type transducers having a primary use for testing materials to ascertain factors, such as flaws, thickness, etc.

More specifically, the present invention relates to such ultrasonic transducers, especially for use in a pulse test technique, and the method of manufacturing such transducers to increase efficiency and to decrease failure of elements of the transducers or inefficient operation thereof.

In the structure of such ultrasonic transducers it is highly desirable that the high frequency ultrasonic pulses flowing therefrom in use and being received thereby in use have high intensity and sharp cutoff for transmission into and reception from a material of such pulses.

It is known that various piezoelectric materials of a crystalline nature, including synthetic materials, are operated to provide the electromechanical coupling efficiency necessary to the generation of high intensity ultrasonic waves. Such materials can include, but not being limited thereto, quartz, monocrystalline materials such as lithium sulfate, polycrystalline materials such as barium titanate and various other synthetic crystalline and ceramic materials.

In techniques presently in use for the manufacture or construction of ultrasonic transducers the transducing element is in the nature of a wafer of the material which is polarized in the desired mode, such for example as the thickness mode where the wafers are lapped to varying frequencies which can be in the range between 0.5 mc. to 25 mc. and which are thereafter incorporated in the construction of various testing transducers.

It has been found that frequently these wafers, depending upon the material used and the thickness of the wafer or the desired frequency, tend to crack or fracture because of the high order of stresses produced either in the formation, processing or subsequent energizing of the wafer in a transducer with a high electrical force.

It is an important object of the present invention to provide a transducer of the nature described and a method of fabrication thereof which overcomes the previously known drawbacks of such transducers and to produce a transducer and a novel means of fabrication which results in the ability to realize the potential strength of the wafers used in the transducers.

The present invention in practice prevents the buildup of stresses in local areas of such crystalline or the like wafers due to structural discontinuities, such as wafer imperfections, chips, having a greater likelihood of creation in thin wafer construction, inclusions formed by scratches or other factors and the like.

The present invention will be more readily apparent from the following description of practice of the present invention and transducers resulting from this process when taken together with the accompanying drawings in which.

Briefly, the present invention is directed to a method of processing and manufacturing various elements to be incorporated in and forming an ultrasonic transducer wherein highly improved techniques and results are obtained.

According to the present invention, a novel concept or means is provided of realizing the potential strength of the transducer element or wafer by preventing a buildup of stresses in local areas which can result in inefficient operation and/or a complete breakdown of the wafer per se either in production or in operation. This is effected in the present invention by a method which minimizes effects due to structural discontinuities, such as wafer imperfections, chips, inclusions and the like, by synthetically and intentionally producing a multiplicity of discontinuities over the entire active surface areas of the transducer wafer or element. The result of this practice is a cancellation of local stress areas which in some instances are produced by unintentional stress risers, by distributing stress evenly between a substantial multiplicity of new stress risers which are intentionally introduced.

Figure 1:
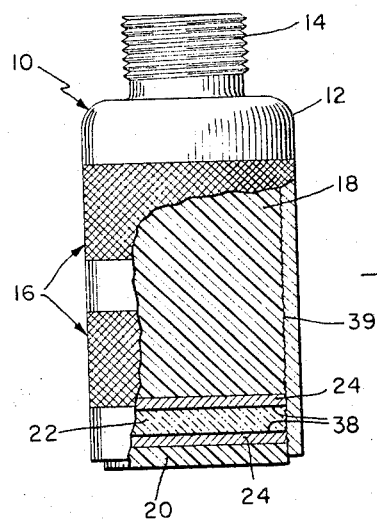
FIG. 1 is an elevational view of one form of a transducer with parts thereof being broken away and partially in section for clarity of disclosure.

Referring now more specifically to the drawings, a transducer construction, generally designated 10, is shown in FIG. 1 and which includes the usual holder 12 of metal or the like, having a threaded connector 14 for connecting the transducer to a co-axial cable or the like. The holder can, if desired, include external knurled areas, such as at 16, to facilitate handling and use of the transducer.

The transducer 10 incorporates in the interior thereof a sandwich-like arrangement including a backing material or member 18 in a usually known manner and an externally extending wear plate 20 which can be of any known type or construction. Interposed between the backing material and the wear plate is the active transducing element or wafer 22, having on opposite faces thereof electrically conductive electrodes 24 which can be formed in accordance with known materials and techniques.

The element 22 in the present invention consists of a piezoelectric wafer which in usual practice can be quartz, polycrystalline material such as barium titanate, monocrystalline material such as lithium sulfate, or other ceramic materials, all of which are susceptible of utilizing the teachings of the present invention. In the practice heretofore known the element 22 is lapped to the desired frequency but the drawbacks above mentioned are inherent in the processing of such wafers and in the subsequent incorporation in and use of the completed transducer.

Figure 3:
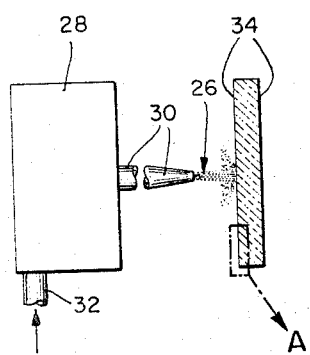
FIG. 3 is a schematic elevational view depicting the method of the present invention.

In accordance with the teachings of the present invention such elements or wafers referring to FIG. 3 are subjected to a fine stream of grit material 26, propelled from a reservoir or container 28 through a tube or the like 30 which can, if desired, be flexible and an air source for propelling the grit against the wafer element is shown as a tube or conduit 32. It has been found that an aluminum oxide powder of approximately 14½ micron size utilized and propelled against the entire face of the wafer results in the formation in the face of a multiplicity of intentionally provided discontinuities. The result, which is a very minutely roughening of the surface, is to create a multiplicity of intentionally formed stress risers over the face of the wafer which results in cancellation of local stress areas which might be the result of or produced by unintentional stress risers on the face of the wafer and around which are intentional stress risers. There is a tendency for stresses to center, such as around a notch for example, which thereby creates a point or area which is highly susceptible to causation of breakage of the wafer either in processing or in use.

Figure 4:
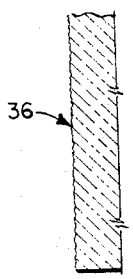
FIG. 4 is a fragmentary enlarged view of the portion marked "A" in dotted lines in FIG. 3, showing a resultant piezoelectric wafer configuration in accordance with the invention.

Preferably, both of the faces 34 of the wafer are so treated and the result is depicted in FIG. 4 where the multiplicity of discontinuities is generally indicated at 36.

Another advantage of the present invention achieved by the present method is the improvement of surfaces for the bonding of electrodes, attachment of wear plates used in contact-type transducers as shown in FIG. 1, and adhering backing and/or facial loading materials to the element wafer used in other types, such as shown for example in FIG. 2, and which will be hereinafter described.

An adhesive material 38 is utilized to join or adhere the foil electrode 24 to the opposite faces of the wafer 22 and it has been found that the multiplicity of discontinuities results in a better bonding of the electrodes. Additionally it is possible, and within the teachings of the present invention, that the foil electrodes, wear plates of fused quartz, aluminum oxide, or other hard materials, and all other surfaces used in the fabrication of the transducer which require good surface bonding properties, can similarly be improved by the grit-blasting technique of the present invention as will be readily understandable. In this connection it has been found to be of substantial significance and importance to grit-blast the interior diameter surface of the metal holder 12 as indicated at 39. The adherence of the backing material 18 to the metal of the holder is very appreciably increased and this is of great value when the transducer is to be used for immersion testing to prevent entry of water into the interior of the transducer which would serve to short-circuit the transducer or dissolve the material of the transducer element when formed for example of lithium sulfate or other monocrystalline materials.

The creation of the intentionally formed multiplicity of stress risers diminishes the tendency of breakage in fabrication of the transducer, such as during curing of the backing materials etc. at elevated temperatures and pressures when utilizing certain materials, and enhances operation and diminishes the possibility of breakage in usage of the transducer.

Figure 2:
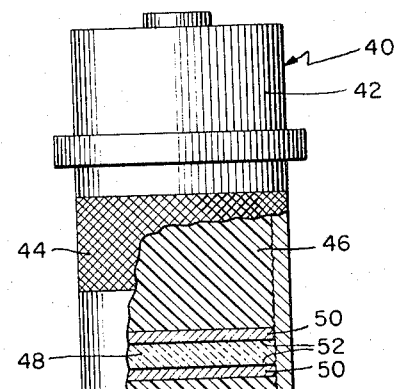
FIG. 2 is a view similar to FIG. 1 of a different form of transducer but embodying the teachings of the present invention.

FIG. 2 discloses a modified form of transducer 40 including a holder 42, knurled area 44, backing material 46, piezoelectric wafer 48, electrodes 50, adhered to the faces of the wafer 48 by adhesive 52 and a facial load material 54 which can be of the same material as backing 46, all of which provide the completed transducer 40 and in which the present technique has been utilized.

Manifestly, minor changes or modifications can be effected in the present invention, as above described, without departing from the spirit and scope of the invention as defined in and limited solely by the appended claims.

What I claim is:

1. In an ultrasonic transducer, a transducer element, an electrically conductive metallic foil electrode bonded to at least one face of said transducer element, said one face of said transducer element including said electrode having a multiplicity of discontinuities formed over substantially the entire said one face to thereby cancel local stress areas produced by unintentional local stress buildup areas on said one face by distributing stresses substantially evenly between a multiplicity of stress risers introduced by said discontinuities.

2. In a transducer as claimed in claim 1, backing material in said transducer in intimate contact with the inner one of said foil electrodes and the mating surfaces having a multiplicity of discontinuities formed therein.

3. In a transducer as claimed in claim 2, and further including means disposed externally of the outer of said electrodes and constituting a wear plate or facial load means and being similarly bonded to the outer of said electrodes.

4. In a transducer as claimed in claim 1, said transducer including an external holder, the interior surface of said holder having a multiplicity of discontinuities formed therein, backing material in said transducer inwardly disposed from said transducer element, adherence between said backing material and inner face of said holder being substantially increased and improving water penetration resistance in said transducer.

5. In a transducer as claimed in claim 1, wherein the face is eroded with a fine stream of aluminum oxide of a micro size powder to thereby minutely roughen the surfaces of the element.

References Cited

UNITED STATES PATENTS

| | | | |
|---|---|---|---|
| 2,345,648 | 4/1944 | Wolfskill | 310—9.5 |
| 2,445,310 | 7/1948 | Chilowsky | 29—25.35 |
| 2,731,573 | 1/1956 | Hansen | 310—8.3 |
| 2,799,789 | 7/1957 | Wolfskill | 310—9 |
| 2,875,354 | 2/1959 | Harris | 310—8.2 |
| 2,956,185 | 10/1960 | Von Stocker | 310—8.7 |
| 3,340,410 | 9/1967 | Sanford | 310—9.1 |
| 2,988,728 | 6/1961 | Marlow | 310—9.5 |

MILTON O. HIRSHFIELD, *Primary Examiner.*

J. D. MILLER, *Examiner.*